United States Patent [19]
Wojtowicz

[11] Patent Number: 4,484,390
[45] Date of Patent: Nov. 27, 1984

[54] PIEROGI CUTLER WITH PIVOTED FORMING TOOL

[76] Inventor: Frank J. Wojtowicz, 111 Casey Ave., Wilkes-Barre, Pa. 18702

[21] Appl. No.: 424,552

[22] Filed: Sep. 27, 1982

[51] Int. Cl.³ .............................................. B26B 3/00
[52] U.S. Cl. ...................................... 30/316; 425/293
[58] Field of Search ................ 30/316, 314, 315, 130; 425/293

[56]  References Cited
   U.S. PATENT DOCUMENTS

| | | | |
|---|---|---|---|
| 181,918 | 9/1876 | Cushing | 30/315 |
| 1,720,839 | 7/1929 | Jarosz | 30/316 X |
| 2,214,475 | 9/1940 | Napolillo | 30/316 X |
| 2,778,325 | 1/1957 | Cesare | 30/316 X |
| 3,053,203 | 9/1962 | Gaddini | 30/130 X |
| 3,234,895 | 2/1966 | Leiby | 30/315 X |
| 4,327,489 | 5/1982 | Conrad | 30/315 X |

*Primary Examiner*—Jimmy C. Peters

[57]  ABSTRACT

A method and apparatus for preparing a dough encased filling commonly known as a pierogi. In the making of a pierogi, a filling material consisting of various ingredients such as meats and vegetables or the like are first placed on a sheet of dough and the sheet of dough is folded over the filling material. Following this operation, the implement of the present invention is employed to cut dough and to subsequently crimp the edges of the cut dough so as to seal the dough around the filling material. Thereafter the product is ready for baking or other form of cooking.

1 Claim, 9 Drawing Figures

PIEROGI CUTTER WITH PIVOTED FORMING TOOL

BACKGROUND OF THE INVENTION

In the making of a pierogi or similar dough encased filling food product, it is common to first prepare the filling material and to thereafter deposit a certain amount of such filling onto a flattened sheet of dough and to then fold the dough sheet over the deposited filling material to thus encase the filling within the sheet of dough. Following the encasement of the filling material within the sheet of dough, it is then necessary that the dough sheet with the filling material encased therein be cut around the encased filling and to also crimp the edges of the cut sheet of dough to thus seal the filling material within the dough sheet.

One of the objects of the invention is to provide a hand held implement which is employed not only to cut the dough around the encased filling material but to also crimp the edges of the cut dough so as to seal the filling material within the dough sheet.

Another object of the invention is to provide in a single hand held implement a combined dough cutter and a dough edge crimper whereby the edges of the dough are crimped so as to seal the filling material within the dough sheet preparatory to baking or otherwise cooking the formed product.

Another object of the invention is to provide in a single hand held implement a combined dough cutter and an edge crimper for the cut dough, the implement being first used to cut the dough around a filling material which has been deposited onto the sheet of dough and then by reversing a pivotal member forming a part of the implement to present a grooved or channeled surface to impart a crimp to the edges of the cut dough.

Yet another object of the invention is to provide a combined dough cutter and edge crimper which can be easily and economically manufactured and which may vary in form so that products of different designs may be made with the single hand held implement.

In the specification and the annexed drawings, the invention is illustrated in the form considered to be the best and most feasible but it is to be understood that the invention is not limited to such form, and it is also to be understood that in and by the claims, it is desired to cover the invention in whatsoever form it may be embodied.

DESCRIPTION OF THE PREFERRED EMBODIMENT

Figure 1:
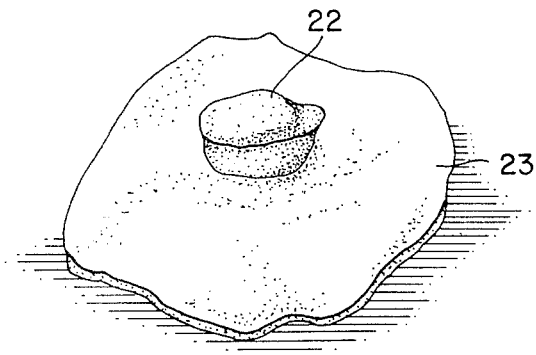
FIG. 1 is a view showing a flattened sheet of dough with the filling material thereon which is to be encased within the dough sheet.

Before undertaking a complete description of the invention, it is pointed out that although the implement is intended primarily in the formation of a pierogi, the implement may be as effectively employed in the formation of other food products where it is intended to encase a filling material within a sheet of dough and to subsequently cut the dough and also to crimp the edges of the cut dough so as to seal the filling material within the cut dough prior to baking or otherwise cooking the same.

Referring now to the drawings wherein like reference numerals are employed to designate like parts throughout the several views, 10 designates in general, the implement of the present invention. As shown in the drawings, the implement is circular in formation but the same may take other forms such as square, rectangular, etc. in cross-section and still be as equally effective in the formation of a pierogi or other food product which consists of a filling material encased within a sheet of dough.

The implement shown generally at numeral 10 can be made wholly or in part of metal, plastic, or a combination of these materials. Mounted in an opening 11 formed in an outer housing 12 is a pivoted inner forming tool 13 which comprises a smooth surface 14 on one side thereof whereas the opposite side is provided with slotted members 15, for a purpose to be more fully described hereinafter.

Figure 7:
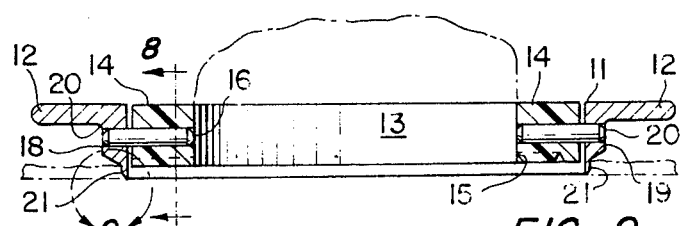
FIG. 7 is a view taken on line 7—7 of FIG. 6, looking in the direction of the arrows.
Figure 8:
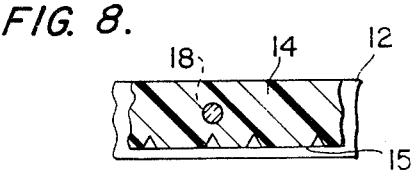
FIG. 8 is a section taken on line 8—8 of FIG. 7, looking in the direction of the arrows.
Figure 9:
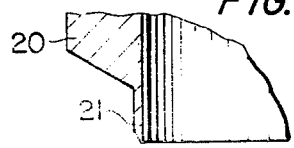
FIG. 9 is an enlarged view of the area encircled by reference numeral 9 of FIG. 7.

As shown more particularly in FIG. 7 of the drawings, dowel pins 16 and 17 are fixedly mounted on the forming tool 13 and the outer ends thereof extend into vertically extending slots 18, 19 formed in the walls 20 of the outer casing 12. As shown more particularly in FIG. 9 of the drawings, the lower portion of the wall 20 terminates in a sharpened edge 21.

Figure 2:
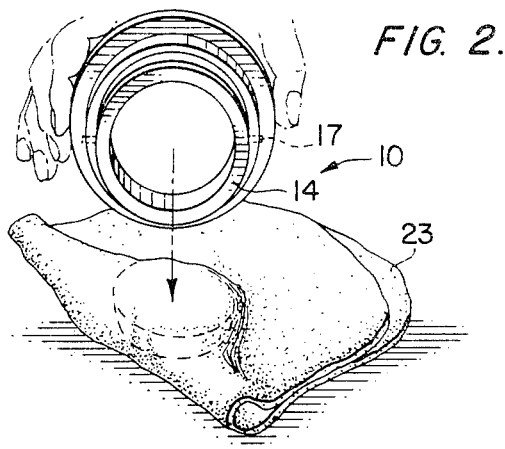
FIG. 2 is a view showing the filling material encased within the folded over sheet of dough.
Figure 3:
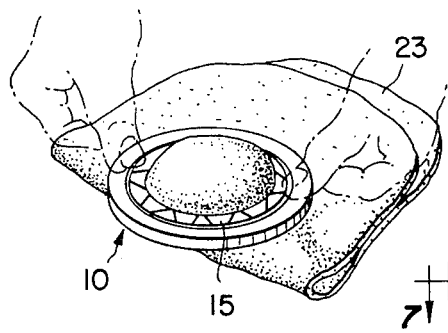
FIG. 3 is a view showing the manner in which the implement is employed as a means for cutting the edges of the dough encasing the filling material.
Figure 6:
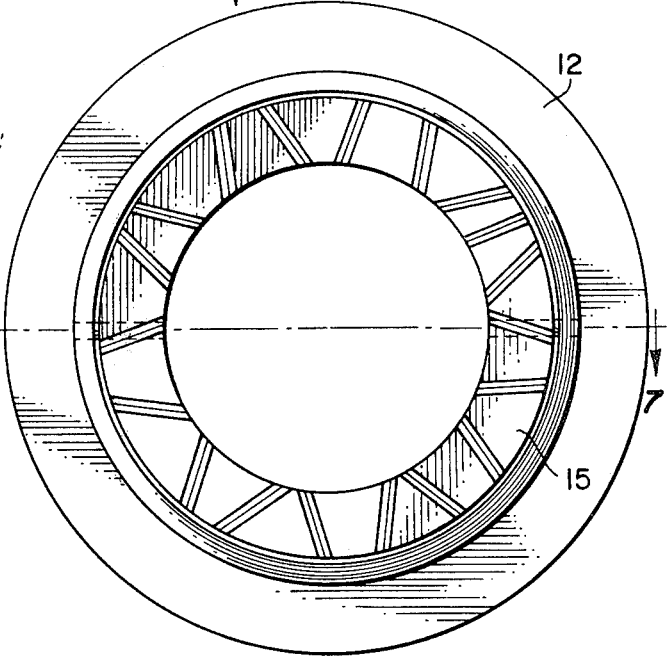
FIG. 6 is a top plan view showing the grooved side of the implement for crimping the edges of the sheet of dough.
Figure 4:
FIG. 4 is a view showing the cut product with the smooth side of the cut dough on the upper surface.
Figure 5:
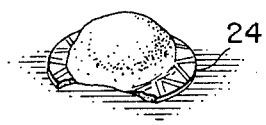
FIG. 5 is a view showing the crimped edges of the sheet of dough.

In use, the filling material 22 for the product to be produced is placed on a flattened sheet of dough 23 such as shown in FIG. 1 of the drawings. Next, the sheet of dough is folded over the filling material and then the hand held implement 10 is guided downwardly towards the filling and dough covering as shown in FIG. 2 of the drawing. Further downward movement of the implement will cause the smooth surface 14 of the forming tool to engage with the dough and since the forming tool 13 is mounted in the vertically extending slots 18, 19 further downward movement of the implement will cause the sharpened edge to contact and cut the dough such as shown in FIGS. 3 and 4 of the drawings. It will be noted that the slotted surface 15 of the forming tool 13 is uppermost during the cutting operation and that initially the edges of the cut dough are relatively flat. Following this operation, the forming tool 13 which is pivotally mounted on the dowel pins 16, 17 is rotated 180° so as to present the slotted surface 15 lowermost when the implement is again pressed downwardly over the product shown in FIG. 4 of the drawings so as to effect a crimping of the edges of the dough such as shown at 24. This will effect a seal of the dough around the filling which has been encased in the sheet of dough. This completes the formation of the pierogi or other food product and the same is now ready for baking or other cooking operation.

It will be seen that I have provided an implement and method for forming a pierogi or other similar food product and the implement may be readily manufactured in an economical manner.

I claim:

1. A hand held implement for cutting a sheet of dough which encases a filling material and to thereafter crimp the edges of the aforesaid cut dough, the implement comprising an outer casing having a cutting edge along the lower portion thereof, an inner forming tool pivotally mounted within an opening formed in said outer casing, said forming tool having a smooth surface along one side thereof and a slotted surface provided along the other side of said forming tool, said pivotal arrangement comprising a pair of diametrically opposed dowel pins fixedly mounted in the outer wall of said forming tool, diametrically opposed slots formed in said outer casing, said diametrically opposed slots in alignment with said diametrically opposed dowel pins, said dowel pins and said diametrically opposed slots permitting said inner forming member to rotate 180° within said opening in said outer casing to thus enable the implement to first cut the dough encasing the filling material and then to rotate the inner forming member 180° to present the slotted surface on said forming member whereupon the implement is pressed against the cut sheet of dough to thereby crimp the dough along the edges of the cut sheet of dough.

* * * * *